UNITED STATES PATENT OFFICE.

LIONEL B. HOLLIDAY AND LOUIS G. BADIER, OF HUDDERSFIELD, ENGLAND, ASSIGNORS TO L. B. HOLLIDAY & CO. LIMITED, OF HUDDERSFIELD, ENGLAND, A CORPORATION OF GREAT BRITAIN.

PROCESS OF MANUFACTURE OF PICRIC ACID FROM DINITROPHENOL IN CRYSTAL FORM AND THE ELIMINATION THEREFROM OF THE SULPHATE OF LEAD.

1,413,914. Specification of Letters Patent. Patented Apr. 25, 1922.

No Drawing. Application filed December 30, 1919. Serial No. 348,467.

(GRANTED UNDER THE PROVISIONS OF THE ACT OF MARCH 3, 1921, 41 STAT. L., 1313.)

*To all whom it may concern:*

Be it known that we, LIONEL BROOK HOLLIDAY, a subject of King George V of Great Britain, and LOUIS GEORGES BADIER, a citizen of the Republic of France, residing at Huddersfield, in the county of York, England, have invented a new and useful improvement in the processes of manufacture of picric acid from dinitrophenol in crystal form and the elimination therefrom of the sulphate of lead, (for which we have filed an application in Great Britain, Jan. 31, 1916, Patent No. 124,490,) of which the following is a specification.

This invention relates to the manufacture of picric acid from dinitro phenol and has for its object to obtain in the improved process picric acid crystallized and to eliminate or substantially eliminate the sulphate of lead contained in the sulphuric acid employed in the nitration of dinitro phenol, as for instance, according to the process described and claimed in our United States Patent No. 1,349,802, of August 17, 1920.

As it is found to be very difficult to obtain sulphuric acid free from sulphate of lead, we have discovered that by an improved process, we can manufacture from dinitro phenol pure crystallized picric acid although using sulphuric acid containing sulphate of lead. In order to nitrate the dinitrophenol, we prefer to first treat it with about two and one-half times its weight of concentrated sulfuric acid, and then add to the mixture nitric and sulfuric acids in about equal proportions and with the nitric acid from three to seven per cent in excess of the quantity required by theory to effect complete nitration, the temperature of the mixed liquids being maintained at from 20° to 30° centigrade while the nitration is being effected.

According to our invention, after having nitrated the dinitro phenol as set forth and after the last addition of the mixed acid (nitric acid and sulphuric acid) we heat the mass to say 85° centrigrade or thereabouts and then add hot water of say 85° centigrade or thereabouts, or blow in steam, in sufficient quantity to raise the temperature of the mass to over the melting point of picric acid, after which the mass is agitated and cooled. In the course of the cooling and agitating the picric acid forms in small and dense or compact crystals.

When the temperature has fallen to 25° or 30° centigrade we filter the mass in order to separate the picric acid crystals from the sulphuric acid which contains the bulk of the sulphate of lead in solution. We then wash the picric acid crystals with weak sulphuric acid containing a very low percentage of or no sulphate of lead, such washing removing the sulphate of lead contained in the crystals. The concentration of the weak sulphuric acid used should be sufficiently strong to hold the sulphate of lead in solution at as low a temperature as 25° centigrade.

We afterwards wash, filter and dry the picric acid crystals in well known manner.

Having thus described our invention, what we claim as new and desire to secure by Letters Patent is:

A method of manufacturing picric acid, which consists in first nitrating dinitrophenol with sulfuric and nitric acids at a temperature of from twenty to thirty degrees centigrade, then heating the mixture to a temperature above the melting point of picric acid, then agitating the heated mixture while allowing it to cool and deposit the picric acid in crystals, and finally separating the crystals from the liquid.

In testimony whereof we affix our signatures in the presence of two witnesses.

LIONEL B. HOLLIDAY.
LOUIS G. BADIER.

Witnesses:
JOSEPH F. BYGOTT,
THOMAS H. BARRON.